March 7, 1939. F. G. HODELL 2,149,342
TIRE CHAIN FOR TRACTORS
Filed Sept. 30, 1936
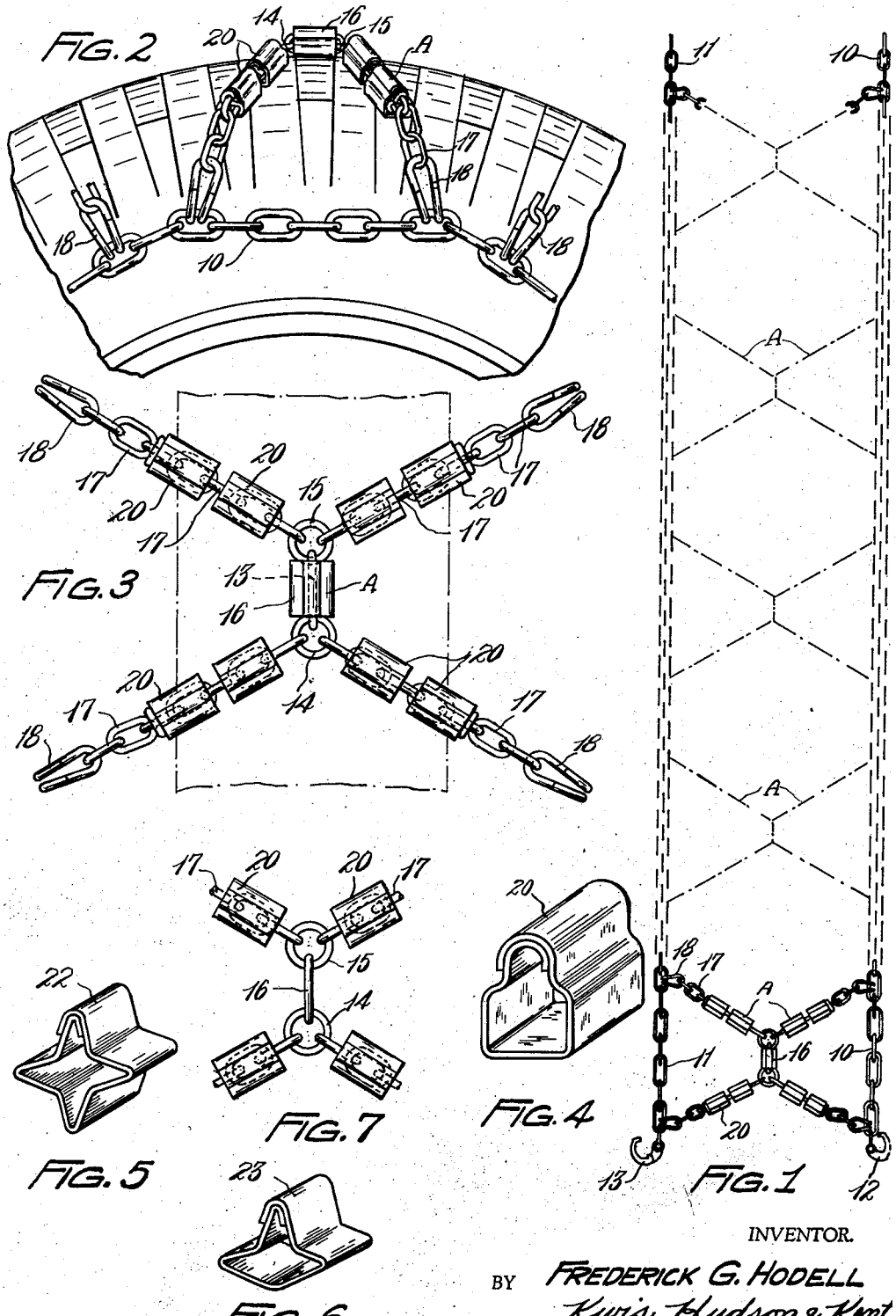
INVENTOR.
BY FREDERICK G. HODELL
Kwis Hudson & Kent
ATTORNEYS Patented Mar. 7, 1939

2,149,342

UNITED STATES PATENT OFFICE 2,149,342

TIRE CHAIN FOR TRACTORS

Frederick G. Hodell, Cleveland Heights, Ohio, assignor to The Hodell Chain Company, Cleveland, Ohio, a corporation of Ohio Application September 30, 1936, Serial No. 103,378

7 Claims. (Cl. 152—245)

The present invention relates to tire chains for motor driven vehicles, and more particularly to tire chains especially adapted for use with pneumatic tired tractors.

An object of the present invention is the provision of a novel and improved reinforcing tread member adapted to be applied to tire chains for the purpose of increasing the traction thereof and the amount of material adjacent the tread portion of the tire.

Another object of the invention is the provision of a novel and improved tire chain especially adapted for use with pneumatic tired tractors which will provide maximum traction and in turn permit the utilization of the full horse power of the tractor under adverser conditions, such as on muddy or frozen ground, or in a heavy wet cover crop.

Another object of the invention is the provision of a novel and improved tire chain especially adapted for use with pneumatic tired tractors that will be flexible, and inexpensive to manufacture, and which will have a maximum amount of material in the tread portion thereof.

The present invention resides in certain details of construction, and combinations and arrangements of parts, and further objects and advantages thereof will be apparent to those skilled in the art to which it relates from the following description of the preferred embodiment thereof described with reference to the accompanying drawing, forming a part of this specification, in which similar reference characters designate corresponding parts throughout the several views, and in which:

Fig. 1 is a plan view of a tire chain embodying the present invention;

Fig. 2 is a perspective view of a portion of a pneumatic tractor tire with the tire chain shown in Fig. 1 in place thereon;

Fig. 3 is an enlarged plan of one of the cross chains shown in Fig. 1;

Fig. 4 is a perspective view of one of the tubular tread members shown in Figs. 1, 2 and 3;

Figs. 5 and 6 are perspective views similar to Fig. 4 showing alternative constructions of the tubular tread members; and Fig. 7 is a view somewhat similar to Fig. 3 but showing a modified construction.

Referring to the drawing, the preferred embodiment of the invention shown therein is especially adapted for use with pneumatic tired tractors. Generally speaking, the chain shown comprises a pair of heavy case hardened rim chains 10 and 11 connected at spaced intervals by a plurality of X-shaped or H-shaped cross chains designated generally by the reference character A. The rim chains 10 and 11 are provided with fasteners 12 and 13 respectively, for detachably connecting opposite ends thereof together as is the usual custom.

Each of the cross chains A comprises a plurality of diagonally extending chain lengths or sections hereinafter referred to as side sections connected to a longitudinally extending center chain length or section comprising one or more links, hereinafter referred to as the center section, and to the rim chains 10 and 11. In the embodiment shown the center section comprises a link 13 connected to two circular end rings 14 and 15, and a non-circular tubular reinforcing tread member 16, slidable but non-rotatable on the link 13. The side sections extend diagonally of the length of the chain and each comprises a plurality of links 17 connected together and to one of the end rings 14 and 15 of the center section. As shown, one end of each of two side sections is connected to each end ring and the other ends thereof are connected at spaced points to the rim chains by connector links 18. Preferably the two side sections of a cross chain connected to the same end ring are connected to opposite rim chains as shown in Fig. 1, with the center chain or section extending parallel with the rim chains, or in the plane of the tire, but it is to be understood that the two side sections connected to the same end ring may be connected to the same rim chain, in which event the center chain section extends transversely of the tire.

For the purpose of increasing both the traction of the chain and the bulk of the material adjacent the tread portion of the tire, the cross chains are provided with a plurality of non-circular tubular reinforcing tread members 20, similar in construction to the tread member 16, previously referred to, applied to the side sections thereof. The tread members 20 surround the links 17 of the side sections and are preferably made of sheet steel bent or formed to a tubular T-shape with a wide lap joint at the upper end thereof. The tubular T-shape of the tread members permit the same to slide longitudinally of the links 17 while preventing relative rotation therebetween. This construction prevents the tread members from acting like rollers under the tire and maintains the same in the desired position, that is, with the part thereof which corresponds to the cross arm of the T-shape adjacent the tire and the lap joint projecting out. The wide lap joint along the top of the tread members provides maximum material at the point of greatest wear. The tread members 20 are preferably longer than the length of the links 17 which they encircle, and the height of the projecting part, above the portion of the tread member which corresponds to the cross-arm of the T, is preferably greater than the width thereof.

In order to retain the flexibility of the chain the tubular tread members 20 are preferably made relatively short and two or more employed on each side section. When a small number of tread members 20 are employed on each side section, as is the case in the embodiment shown, provision should be made for limiting the longitudinal movement of the tread members along the side sections so as to maintain the same in the location of the tread portion of the tire. In the present instance this is accomplished by links 21 secured to the side sections of the cross chains, but it will be apparent that any other suitable means may be employed for limiting the movement of the tread member along the cross chains. If the cross chains are entirely enclosed in tread members it is not necessary to provide separate means for limiting the movement of the tread members therealong.

The tread members shown are preferably made without welding, etc., which materially decreases the cost of the chain. The rings 14 and 15 are free to rotate and distribute the wear thereover, thus increasing the life of the chain. Preferably the tread members 16 and 20 are of tubular T-shape in cross-section but it will be apparent that the shape thereof may be varied so long as the construction employed prevents rotation thereof relative to the tire with which they are employed. Two alternative constructions are shown in Figs. 6 and 7. The tubular tread member 22 shown in Fig. 5 is star-shaped in cross-section with a wide lap joint adjacent the upper point of the star, and the tubular tread member 23 shown in Fig. 6 is similar thereto except that the lower point of the star is omitted. If desired, the tread member on the center link may be omitted, as shown in Fig. 7.

In the present embodiment of the invention the sleevelike tread members 20 are applied to cross chains of a particular construction but it will be apparent that they may be used with conventional cross chains for the purpose of reinforcing the same and increasing the bulk of the material in the tread portion thereof.

From the foregoing description of the preferred embodiment of the invention it will be apparent that the objects of the invention have been accomplished and that an improved tire chain has been provided. While the preferred embodiment has been described with considerable detail, I do not wish to be limited to the particular construction shown, which is merely illustrative of the invention, and which may be varied within the scope thereof. It is my intention to cover all adaptations, modifications and uses thereof that come within the practice of those skilled in the art to which this invention relates, and I particularly point out and claim as my invention the following:

1. A cross chain comprising a chain length and T-shaped tubular tread members slidable but non-rotatable thereon.

2. A cross chain comprising a center section, a plurality of side sections connected to said center section and adapted to be connected to rim chains, and T-shaped tubular tread members slidable but non-rotatable on said side sections.

3. A tire chain comprising a pair of rim chains, and a plurality of cross chains connected to said rim chains, each of said cross chains comprising: a center section including circular end rings, a plurality of diagonally extending side sections connected to each of said rings and to said rim chains, and a plurality of T-shaped tubular reinforcing tread members slidable but non-rotatable on each of said side sections.

4. A tread member for tire chains comprising a non-circular sleeve member made of sheet metal bent to the desired shape and having an interlocking lap joint along one side thereof.

5. A cross chain comprising a plurality of links and a non-circular tubular tread member encircling a portion thereof, said tread member being longer than the length of the links encircled thereby.

6. In a tire chain the combination of a cross chain comprising a plurality of ordinary straight links and a reenforcing tread member or sleeve encircling a plurality of the links of said cross chain, said tread member consisting of a tubular sleeve having a portion thereof provided with a reversed bend forming a lateral projection, the height of which is greater than the width thereof.

7. In a tire chain the combination of a cross chain comprising a plurality of ordinary straight links and a reenforcing tread member or sleeve encircling a plurality of the links of said cross chain, said tread member consisting of a tubular sleeve of star-shaped cross section, the height of each arm of which sleeve is greater than the width thereof.

FREDERICK G. HODELL.